(12) United States Patent
Fuchs

(10) Patent No.: US 9,539,717 B2
(45) Date of Patent: Jan. 10, 2017

(54) PORTABLE POWER TOOL

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 14/002,501

(22) PCT Filed: Mar. 2, 2012

(86) PCT No.: PCT/EP2012/000919
§ 371 (c)(1),
(2), (4) Date: Nov. 18, 2013

(87) PCT Pub. No.: WO2012/116830
PCT Pub. Date: Sep. 7, 2012

(65) Prior Publication Data
US 2014/0096399 A1 Apr. 10, 2014

(30) Foreign Application Priority Data

Mar. 3, 2011 (DE) ........................ 10 2011 005 041

(51) Int. Cl.
| B25F 5/02 | (2006.01) |
|---|---|
| B23D 57/02 | (2006.01) |
| B27B 17/00 | (2006.01) |
| B27B 17/08 | (2006.01) |
| B23D 57/00 | (2006.01) |
| B27B 17/02 | (2006.01) |

(52) U.S. Cl.
CPC ........... *B25F 5/029* (2013.01); *B23D 57/0092* (2013.01); *B23D 57/023* (2013.01); *B27B 17/00* (2013.01); *B27B 17/02* (2013.01); *B27B 17/08* (2013.01)

(58) Field of Classification Search
CPC .... B26B 29/00–29/025; B27B 17/00–17/0033
USPC ....... 30/123.4, 151, 154, 376, 381, 383, 386
See application file for complete search history.

(56) References Cited

U.S. PATENT DOCUMENTS

| 2,730,803 A * | 1/1956 | Kimball ................... A01G 3/08 30/198 |
| 3,260,287 A * | 7/1966 | Oehrli .................. B23D 63/168 30/123.4 |
| 3,343,613 A * | 9/1967 | Carnesecca, Jr. ...... A01G 3/033 173/169 |
| 3,636,996 A * | 1/1972 | Lanz .............................. 30/371 |

(Continued)

FOREIGN PATENT DOCUMENTS

| CN | 1757472 A | 4/2006 |
| CN | 101823254 A | 9/2010 |
| DE | 201 20 984 U1 | 5/2002 |

OTHER PUBLICATIONS

International Search Report corresponding to PCT Application No. PCT/EP2012/000919, mailed Aug. 6, 2012 (German and English language document) (7 pages).

*Primary Examiner* — Sean Michalski
(74) *Attorney, Agent, or Firm* — Maginot, Moore & Beck LLP

(57) ABSTRACT

The disclosure relates to a portable power tool comprising at least one coupling device which can be coupled to a power tool separation device comprising at least one cutting unit and at least one guide unit for guiding the cutting unit. The portable power tool comprises at least one storage device which is provided to stow the machine tool separation device at least when it is coupled to the coupling device.

9 Claims, 5 Drawing Sheets

(56) References Cited

U.S. PATENT DOCUMENTS

| | | | | |
|---|---|---|---|---|
| 4,033,035 A * | 7/1977 | Trimmer | B23D 59/007 | 30/122 |
| 4,207,675 A * | 6/1980 | Causey | A01G 3/08 | 30/296.1 |
| 4,294,012 A * | 10/1981 | Lanz | | 30/378 |
| 4,382,334 A | 5/1983 | Reynolds | | |
| 4,649,644 A | 3/1987 | Huddleston | | |
| 4,733,470 A * | 3/1988 | Firman | A01G 3/037 | 30/231 |
| 4,760,646 A * | 8/1988 | Siegler | A01G 3/08 | 30/275.4 |
| 4,841,641 A * | 6/1989 | Laidlaw | B27G 19/003 | 30/382 |
| 4,884,340 A * | 12/1989 | Newman | A01D 34/90 | 30/122 |
| 4,916,818 A * | 4/1990 | Panek | A01G 3/08 | 30/296.1 |
| 5,001,858 A * | 3/1991 | Frazar | B27B 17/0008 | 30/296.1 |
| 5,413,158 A | 5/1995 | Wirth, Jr. et al. | | |
| 5,653,028 A * | 8/1997 | Hashimoto | B27B 17/12 | 30/123.4 |
| 5,685,080 A * | 11/1997 | Amano | B27B 17/08 | 30/383 |
| 5,787,536 A * | 8/1998 | Pate | B27B 17/0008 | 30/122 |
| 5,884,403 A * | 3/1999 | Rogers | B27B 17/0008 | 144/24.13 |
| 6,021,826 A | 2/2000 | Daniell | | |
| 6,182,367 B1 * | 2/2001 | Janczak | A01G 3/053 | 30/199 |
| 6,619,171 B2 * | 9/2003 | Wade | B27B 17/02 | 144/34.1 |
| 6,651,347 B2 * | 11/2003 | Uhl | | 30/383 |
| 6,877,233 B1 * | 4/2005 | Franke | | 30/386 |
| 6,944,957 B2 * | 9/2005 | Donnerdal et al. | | 30/386 |
| 7,992,308 B1 * | 8/2011 | Fisher | A01G 3/053 | 188/381 |
| 8,782,910 B1 * | 7/2014 | Lofton et al. | | 30/297 |
| 9,032,630 B2 * | 5/2015 | Brown et al. | | 30/383 |
| 2002/0042997 A1 * | 4/2002 | Uhl | | 30/382 |
| 2002/0125157 A1 * | 9/2002 | Hochstetler et al. | | 206/349 |
| 2003/0024129 A1 * | 2/2003 | Franke et al. | | 30/386 |
| 2003/0075467 A1 * | 4/2003 | Anderson et al. | | 206/349 |
| 2003/0121390 A1 * | 7/2003 | Allemann | B23D 57/023 | 83/788 |
| 2004/0010924 A1 * | 1/2004 | Hung et al. | | 30/255 |
| 2005/0015992 A1 * | 1/2005 | Stones et al. | | 30/124 |
| 2005/0022388 A1 * | 2/2005 | Stones et al. | | 30/123 |
| 2005/0055832 A1 * | 3/2005 | Jaensch | | 30/123 |
| 2007/0000138 A1 * | 1/2007 | Baskar | A01G 3/0417 | 30/392 |
| 2008/0256805 A1 * | 10/2008 | Maddison | A01G 3/08 | 30/134 |
| 2009/0100684 A1 * | 4/2009 | Doragrip | A01G 3/053 | 30/216 |
| 2012/0005905 A1 * | 1/2012 | Brown et al. | | 30/383 |
| 2012/0110863 A1 * | 5/2012 | Brown et al. | | 30/371 |
| 2013/0074989 A1 * | 3/2013 | Capers et al. | | 144/24.13 |

* cited by examiner

PORTABLE POWER TOOL

This application is a 35 U.S.C. §371 National Stage Application of PCT/EP2012/000919, filed on Mar. 2, 2012, which claims the benefit of priority of Ser. No. DE 10 2011 005 041.8, filed on Mar. 3, 2011 in Germany, the disclosures of which are incorporated herein by reference in their entirety.

BACKGROUND

There are already known portable power tools that have a coupling device, which can be coupled to a power-tool parting device that has a cutting strand and a guide unit for guiding the cutting strand.

SUMMARY

The disclosure is based on a portable power tool having at least one coupling device, which can be coupled to a power-tool parting device that has at least one cutting strand and at least one guide unit for guiding the cutting strand.

It is proposed that the portable power tool comprise at least one stowage device, which is provided to stow the power-tool parting device, at least when coupled to the coupling device. A "portable power tool" is to be understood here to mean, in particular, a power tool, in particular a hand-held power tool, that can be transported by an operator without the use of a transport machine. The portable power tool has, in particular, a mass of less than 40 kg, preferably less than 10 kg, and particularly preferably less than 5 kg. A "coupling device" is to be understood here to mean, in particular, a device provided to operatively connect the power-tool parting device to the portable power tool, by means of a positive and/or non-positive connection, for the purpose of working a workpiece. In particular, when the coupling device has been coupled to the power-tool parting device and the portable power tool is in an operating state, forces and/or torques can be transmitted from the drive unit of the portable power tool to the power-tool parting device, for the purpose of driving the cutting strand. The coupling device is therefore preferably realized as a tool receiver. The expression "provided to" is intended here to define, in particular, specially configured and/or specially equipped. The term "drive unit" is intended here to define, in particular, a unit provided to generate forces and/or torques for driving the cutting strand. Preferably, for the purpose of generating forces and/or torques by means of the drive unit, thermal energy, chemical energy and/or electrical energy is converted into energy of motion. In particular, the drive unit is realized such that it can be directly and/or indirectly coupled to the cutting strand. Particularly preferably, the drive unit comprises at least one rotor that has an armature shaft, and at least one stator. Preferably, the drive unit is realized as an electric motor. It is also conceivable, however, for the drive unit to be of another design, considered appropriate by persons skilled in the art.

A "cutting strand" is to be understood here to mean, in particular, a unit provided to locally undo an atomic coherence of a workpiece to be worked, in particular by means of a mechanical parting-off and/or by means of a mechanical removal of material particles of the workpiece. Preferably, the cutting strand is provided to separate the workpiece into at least two parts that are physically separate from each other, and/or to part off and/or remove, at least partially, material particles of the workpiece, starting from a surface of the workpiece. Particularly preferably, the cutting strand, in at least one operating state, is moved in a revolving manner, in particular along a circumference of the guide unit. A "guide unit" is to be understood here to mean, in particular, a unit provided to exert a constraining force upon the cutting strand, at least along a direction perpendicular to a cutting direction of the cutting strand, in order to define a possibility for movement of the cutting strand along the cutting direction. Preferably, the guide unit has at least one guide element, in particular a guide groove, by which the cutting strand is guided. Preferably, the cutting strand, as viewed in a cutting plane, is guided by the guide unit along an entire circumference of the guide unit, by means of the guide element, in particular the guide groove. Preferably, the guide unit is realized as a guide bar. The term "guide bar" is intended here to define, in particular, a geometric form that, as viewed in the cutting plane, has a fully closed outer contour, comprising at least two straight lines that are parallel to each other and at least two connecting portions, in particular arcs, that each interconnect mutually facing ends of the straight lines. The guide unit therefore has a geometric shape that, as viewed in the cutting plane, is composed of a rectangle and at least two circle sectors disposed on opposing sides of the rectangle.

The term "cutting plane" is intended here to define, in particular, a plane in which the cutting strand, in at least one operating state, is moved, relative to the guide unit, along a circumference of the guide unit, in at least two mutually opposite cutting directions. Preferably, during working of a workpiece, the cutting plane is aligned at least substantially transversely in relation to a workpiece surface that is to be worked. "At least substantially transversely" is to be understood here to mean, in particular, an alignment of a plane and/or of a direction, relative to a further plane and/or a further direction, that preferably deviates from a parallel alignment of the plane and/or of the direction, relative to the further plane and/or the further direction. It is also conceivable, however, for the cutting plane, during working of a workpiece, to be aligned at least substantially parallelwise in relation to a workpiece surface that is to be worked, in particular if the cutting strand is realized as an abrasive. "At least substantially parallelwise" is to be understood here to mean, in particular, an alignment of a direction relative to a reference direction, in particular in one plane, the direction deviating from the reference direction by, in particular, less than 8°, advantageously less than 5°, and particularly advantageously less than 2°. A "cutting direction" is to be understood here to mean, in particular, a direction along which the cutting strand is moved, in at least one operating state, as a result of a driving force and/or a driving torque, in particular in the guide unit, for the purpose of generating a cutting clearance and/or parting-off and/or removing material particles of a workpiece that is to be worked. Preferably, the cutting strand, when in an operating state, is moved, relative to the guide unit, along the cutting direction.

The cutting strand and the guide unit preferably together constitute a closed system. The term "closed system" is intended here to define, in particular, a system comprising at least two components that, by means of combined action, when the system has been demounted from a system such as, for example, a power tool, that is of a higher order than the system, maintain a functionality and/or are inseparably connected to each other when in the demounted state. Preferably, the at least two components of the closed system are connected to each other so as to be at least substantially inseparable by an operator. "At least substantially inseparable" is to be understood here to mean, in particular, a connection of at least two components that can be separated from each other only with the aid of parting tools such as, for example, a saw, in particular a mechanical saw, etc. and/or chemical parting means such as, for example, solvents. A "stowage device" is to be understood here to mean, in particular, a device provided to stow the power-tool parting device, when coupled to the coupling device, the power-tool parting device being covered by components of the stowage device and/or of the power-tool housing of the portable power tool. The term "covered" is intended here to define, in particular, a disposition of the power-tool parting device, when the power-tool parting device is in a stowed state, relative to components of the stowage device and/or of the power-tool housing, a total extent of the power-tool parting device, along at least a direction running in the cutting plane, being less than an extent of components of the stowage device and/or of the power-tool housing along the same direction. In particular, the power-tool parting device, when in a stowed state, relative to a total surface are of the power-tool parting device, as viewed in the cutting plane, is more than 20%, preferably more than 30%, and particularly preferably more than 50% covered by components of the stowage device and or of the power-tool housing. Preferably, when the power-tool parting device is in a stowed state, operator contact with cutting elements of the cutting strand can be prevented insofar as possible. When the power-tool parting device is in a stowed state, the cutting elements of the cutting strand are preferably disposed so as to be at least substantially non-contactable by an operator, at least in a partial region of the power-tool parting device. Particularly preferably, operation, in particular a revolving motion of the cutting strand in the guide unit, is prevented when the power-tool parting device is in a stowed state. Preferably, when the power-tool parting device is in a stowed state, it is not possible to perform work on a workpiece by means of the power-tool parting device. Advantageously, the design according to the disclosure makes it possible to achieve a high degree of protection for an operator against injury, when the power-tool parting device is in a stowed state in the stowage device. Moreover, advantageously, a compact portable power tool can be achieved.

It is furthermore proposed that the portable power tool comprise a power-tool housing, having at least one side wall that faces toward the stowage device and that, together with a tool covering element of the stowage device, delimits a receiving opening of the stowage device in which the power-tool parting device can be stowed. Preferably, the power-tool parting device, when swiveled into the receiving opening, is disposed, at least in a partial region, as viewed along a direction running at least substantially perpendicularly in relation to the cutting plane of the cutting strand, between the power-tool housing and the tool covering element. Particularly preferably, the power-tool parting device, when swiveled into the receiving opening, as viewed along the direction running at least substantially perpendicularly in relation to the cutting plane, is covered on one side by the power-tool housing and on a further side by the tool covering element. Preferably, the power-tool parting device, when swiveled into the receiving opening, is covered on at least three sides by the power-tool housing and/or the tool covering element. Advantageously, safe stowage of the power-tool parting device can be achieved.

Advantageously, the tool covering element is at least partially integral with the power-tool housing. "Integral with" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. Advantageously, it is possible to achieve assembly work in assembling of the portable power tool.

It is additionally proposed that the coupling device be mounted so as to be movable relative to the power-tool housing, at least when coupled to the power-tool parting device. The expression "mounted so as to be movable" is intended here to define, in particular, a mounting of the coupling device on the portable power tool, at least when coupled to the power-tool parting device, the coupling device, in particular decoupled from an elastic deformation of the coupling device, having a capability to move along at least a travel distance greater than 1 mm, preferably greater than 10 mm, and particularly preferably greater than 50 mm, and/or a capability to move about at least one axis by an angle greater than 10°, preferably greater than 45°, and particularly preferably greater than 60°. Particularly preferably, the coupling device has a capability to move along at least one travel distance and/or about one axis that is independent of a pure closing movement of the coupling device for the purpose of operatively connecting the power-tool parting device to the portable power tool, and/or of an opening movement of the coupling device for the purpose of releasing the operative connection of the power-tool parting device to the portable power tool. Advantageously, by means of the design according to the disclosure, the coupling device can be moved, for example translationally and/or rotationally, into a position suitable for performing work on a workpiece. Advantageously, therefore, a high degree of flexibility can be achieved in working of a workpiece.

Preferably, the coupling device is mounted such that it can be swiveled, at least relative to the power-tool housing. Preferably, the power-tool parting device, when coupled to the coupling device, can be swiveled, about a swivel axis running at least substantially perpendicularly in relation to the cutting plane of the cutting strand, into the receiving opening of the stowage device, by means of the coupling device. It is also conceivable, however, for the coupling device, alternatively or additionally, to be mounted such that it can be swiveled, relative to the power-tool housing, abut another swivel axis, considered appropriate by persons skilled in the art. Advantageously, in the case of the portable power tool, it is possible to achieve a pocket-knife principle for stowage of the power-tool parting device. When the power-tool parting device is in a in-in state therefore, the cutting elements of the cutting strand of the power-tool parting device can advantageously be covered, at least partially, by components of the stowage device and/or of the power-tool housing.

It is additionally proposed that the portable power tool at least one drive unit and at least one open-loop and/or closed-loop control unit, which is provided to control the drive unit, by open-loop and/or closed-loop control, in dependence on a angular position of the coupling device, relative to the power-tool housing of the portable power tool. An "open-loop and/or closed-loop control unit" is to be understood to mean, in particular, a unit having at least one control device. A "control device" is to be understood to mean, in particular, a unit having at least one processor unit and having at least one memory unit, and having an operating program stored in the memory unit. Particularly preferably, a transmission of a driving torque from the drive unit to the cutting strand is interrupted as soon as the coupling device is swiveled about the swivel axis. Preferably, a supply of energy to the drive unit is prevented, by means of the open-loop and/or closed-loop control unit, when the power-tool parting device is in a in-in state, in order to prevent a driving torque of the drive unit and/or of the transmission unit from being transmitted to the cutting strand. It is also conceivable, however, for the transmission of a driving torque from the drive unit to the cutting strand to be interrupted by means of a mechanical unit. Advantageously, it is possible to achieve a high degree of operating comfort for an operator.

Advantageously, the portable power tool has at least one locking unit, which is provided to fix the coupling device, at least when coupled to the power-tool parting device, in an angular position relative to the power-tool housing. The coupling device can thus advantageously be fixed, by an operator, in a required position relative to the power-tool housing. In addition, advantageously, work can be performed on a workpiece in various angular positions of the coupling device relative to the power-tool housing.

The disclosure is additionally based on a power-tool parting device for a portable power tool according to the disclosure, having at least one guide unit and at least one cutting strand, which together constitute a closed system. Advantageously, it is possible to achieve a versatile tool for performing work on workpieces.

The disclosure is furthermore based on a power-tool system having at least one portable power tool according to the disclosure and having at least one power-tool parting device according to the disclosure. Particularly preferably, the power-tool parting device, when coupled to the coupling device, can be swiveled, about a swivel axis running at least substantially perpendicularly in relation to a cutting plane of the cutting strand, into the receiving opening of the stowage device, by means of the coupling device. Through simple design means, a stowage device for secure stowage of the power-tool parting device can be achieved.

The power-tool parting device according to the disclosure and/or the power tool according to the disclosure are not intended in this case to be limited to the application and embodiment described above. In particular, the power-tool parting device according to the disclosure and/or the power tool according to the disclosure may have individual elements, components and units that differ in number from the number stated herein, in order to fulfill a principle of function described herein.

BRIEF DESCRIPTION OF THE DRAWINGS

Further advantages are given by the following description of the drawing. The drawing shows an exemplary embodiment of the disclosure. The drawing, the description and the claims contain numerous features in combination. Persons skilled in the art will also expediently consider the features individually and combine them to create appropriate further combinations.

In the drawing.

DETAILED DESCRIPTION

Figure 1:
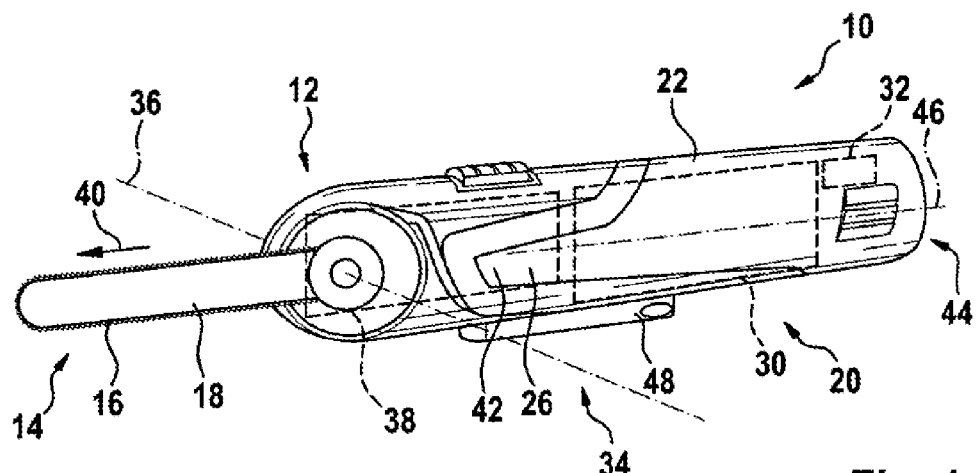
FIG. 1 shows a portable power tool according to the disclosure, having a power-tool parting device according to the disclosure, in a schematic representation.

FIG. 1 shows a portable power tool 10 having a power-tool parting device 14, which together constitute a power-tool system. The portable power tool 10 has a coupling device 12 for positive and/or non-positive coupling to the power-tool parting device 14. The coupling device 12 in this case can be realized as a bayonet closure and/or as another coupling device considered appropriate by persons skilled in the art. The coupling device 12 is additionally provided to operatively connect the power-tool parting device 14 to the portable power tool 10. The coupling device 12 is therefore provided, when in at least one operating state, to be coupled to the power-tool parting device 14, which comprises at least one cutting strand 16, and a guide unit 18 for guiding the cutting strand 16. The portable power tool 10 has a power-tool housing 22, which encloses a drive unit 30 and a transmission unit 34 of the portable power tool 10. The drive unit 30 and the transmission unit 38 are operatively connected to each other for the purpose of generating a driving torque that can be transmitted to the power-tool parting device 14, in a manner already known to persons skilled in the art. In this case, the drive unit 30 and/or the transmission unit 38 are provided, when in a mounted state, to be coupled to a cutting strand 16 by means of the coupling device 12. The transmission unit 38 of the portable power tool 10 is realized as a bevel gear transmission. The drive unit 30 is realized as an electric motor unit. It is also conceivable, however, for the drive unit 30 and/or the transmission unit 38 to be of a different design, considered appropriate by persons skilled in the art. The drive unit 30 is provided to drive the cutting strand 16 of the power-tool parting device 14, at least in one operating state, at a cutting speed of less than 6 m/s. The portable power tool 10 in this case has at least one operating mode in which it is possible for the cutting strand 16 to be driven in the guide unit 18 of the power-tool parting device 14, along a cutting direction 40 of the cutting strand 16, at a cutting speed of less than 6 m/s.

Furthermore, the portable power tool 10 has a stowage device 20, which is provided to stow the power-tool parting device 14 when coupled to the coupling device 12. The power-tool parting device 14 in this case is connected to the coupling device 12 in a positive and/or non-positive manner. The power-tool housing 22 of the portable power tool 10, for the purpose of stowing the power-tool parting device 14, when coupled to the coupling device 12, has a side wall 24, which faces toward the stowage device 20 (FIGS. 3 and 4) and which, together with a tool covering element 26 of the stowage device 20, delimit a receiving opening 28 of the stowage device 20 in which the power-tool parting device 14 can be stowed. The receiving opening 28 is provided to accommodate the power-tool parting device 14 when the power-tool parting device 14 is in a in-in state. The power-tool parting device 14, when in a in-in state, is disposed with a partial region in the receiving opening 28 (FIG. 2).

Figure 3:
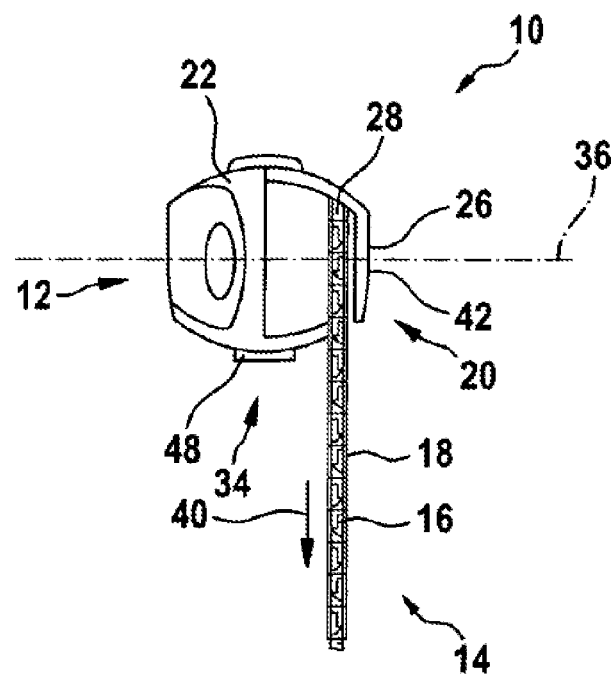
FIG. 3 shows the power-tool parting device according to the disclosure, coupled to a coupling device, in a relative angular position in relation to a power-tool housing of the power tool according to the disclosure, in a schematic representation.
Figure 4:
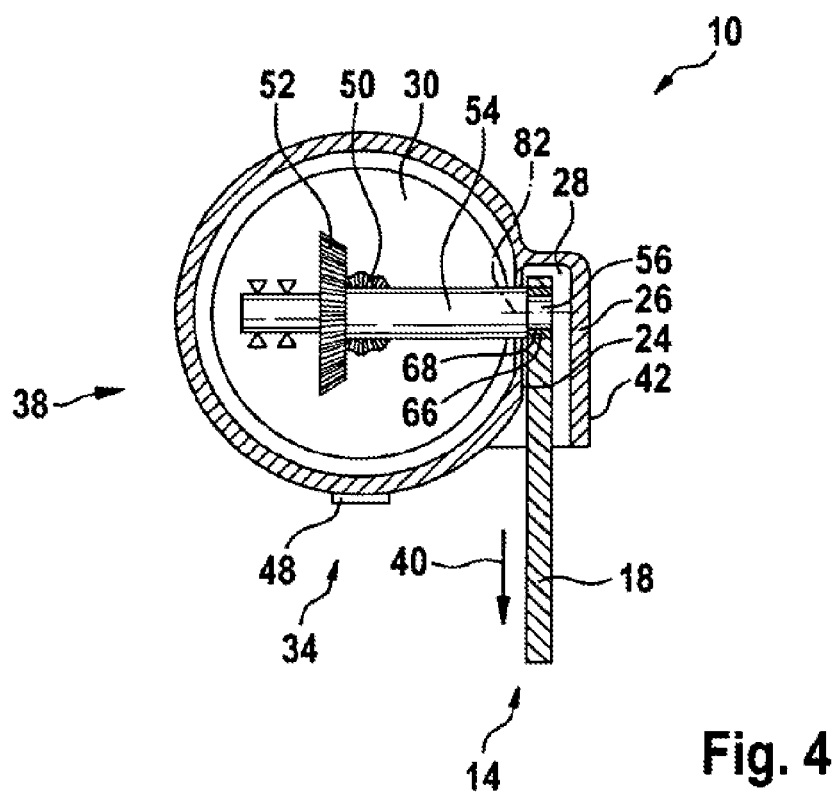
FIG. 4 shows a detail view of a transmission unit of the power tool according to the disclosure, in a schematic representation.

The power-tool parting device 14 in this case, when disposed in the receiving opening 28, in a partial region, as viewed along a direction running at least substantially perpendicularly in relation to a cutting plane of the cutting strand 16, is disposed between the side wall 24 of the power-tool housing 22 and the tool covering element 26. The tool covering element 26, as viewed in a plane perpendicular to the cutting plane of the power-tool parting device 14 coupled to the coupling device 12, is formed on to the power-tool housing 22 in an L shape (FIGS. 3 and 4). It is also conceivable, however, for the tool covering element 26 to be formed on to the power-tool housing 22 in another configuration, considered appropriate by persons skilled in the art. It is additionally conceivable for the tool covering element 26 to be realized by means of a component that is separate from the power-tool housing 22, and that is connected to the power-tool housing 22 by means of a positive and/or non-positive connection. An outer wall 42 of the tool covering element 26, which is disposed on a side of the tool covering element 26 that faces away from the power-tool housing 22, at an end 44 of the power-tool housing 22 that faces away from the coupling device 12, runs in the direction of the power-tool housing 22, starting from the side of the tool covering element 26 that faces away from the power-tool housing 22, and is connected to the power-tool housing 22 in a materially bonded manner. It is also conceivable, however, for the tool covering element 26 of the side of the tool covering element 26 that faces away from the power-tool housing 22 merely to run parallelwise in relation to the side wall 24 of the power-tool housing 22 that faces towards the tool covering element 26.

Figure 2:
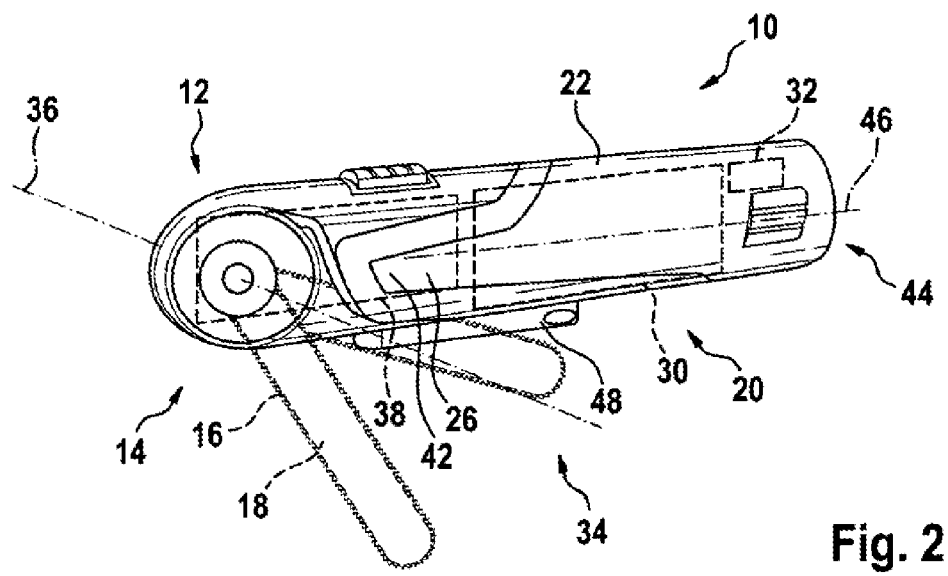
FIG. 2 shows the power tool according to the disclosure, during an operation of swiveling the power-tool parting device according to the disclosure into a receiving opening of a stowage device of the power tool according to the disclosure, in a schematic representation.

For the purpose of stowing the power-tool parting device 14, the coupling device 12, when coupled to the power-tool parting device 14, is mounted so as to be movable relative to the power-tool housing 22 (FIG. 2). The coupling device 12 has a possibility for movement along a travel distance and/or about an axis that is independent of a pure closing movement of the coupling device 12 for the purpose of operatively connecting the power-tool parting device 14 to the portable power tool 10, and/or of an opening movement of the coupling device 12 for the purpose of releasing the operative connection of the power-tool parting device 14 to the portable power tool 10. The coupling device 12 in this case can be moved manually, as the result of application of force, by an operator, upon the coupling device 12, into a position required by the operator and/or for the purpose of stowing the power-tool parting device 14 in the receiving opening 28 of the stowage device 20. It is also conceivable, however, for the portable power tool 10 to comprise a coupling-device drive unit (not represented in greater detail here), which is provided to drive the coupling device 12 to execute a movement that is independent of the opening movement and/or the closing movement. The coupling-device drive unit can be realized, for example, as an electric motor unit, or as another coupling-device drive unit considered appropriate by persons skilled in the art.

The coupling device 12 is mounted such that it can be swiveled relative to the power-tool housing 22. In this case, the coupling device 12 is mounted such that it can be swiveled about a swivel axis 36 running substantially perpendicularly in relation to a drive-unit longitudinal axis 46 of the drive unit 30. The coupling device 12 can be moved by an operator into a required angular position of the coupling device 12 relative to the power-tool housing 22. The angular position of the 12 relative to the power-tool housing 22 in this case lies in an angular range of 180°, by which the coupling device 12 can be swiveled about the swivel axis 36. The portable power tool 10 comprises a locking unit 34, which is provided to fix the coupling device 12, when coupled to the power-tool parting device 14, and when decoupled from the power-tool parting device 14, in an angular position relative to the power-tool housing 22. The locking unit 34 is provided to fix the coupling device 12 in the required angular position, relative to the power-tool housing 22, by means of positive-fit elements (not represented in greater detail here) and/or non-positive-fit elements (not represented in greater detail here) of the locking unit 34. For the purpose of actuating the positive-fit elements and/or non-positive-fit elements, the locking device 34 has an operating element 48. The operating element 48 is realized as an operating lever. It is also conceivable, however, for the operating element 48 to be of a different design, considered appropriate by persons skilled in the art.

In addition, when the power-tool parting device 14 is coupled to the coupling device 12, the swivel axis 36 runs substantially perpendicularly in relation to the cutting plane of the cutting strand 16. The power-tool parting device 14, therefore, when coupled to the coupling device 12, can be swiveled by means of the coupling device 12, about the swivel axis 36 that runs substantially perpendicularly in relation to the cutting plane of the cutting strand 16, into the receiving opening 28 of the stowage device 20 (FIG. 2). An operator actuates the operating element 48 of the locking unit 34 in order to undo a fixing of the coupling device 12 in an angular position relative to the power-tool housing 22. The operator can then swivel the coupling device 12 about the swivel axis 36, in order to swivel the power-tool parting device 14 into the receiving opening 28 of the stowage device 20, for the purpose of stowage. For the purpose of maintaining a position of the power-tool parting device 14 in the receiving opening 28, the operator actuates the operating element 48 of the locking unit again, in order the coupling device 12 in the angular position relative to the power-tool housing 22, which angular position corresponds to a position of the power-tool parting device 14 when swiveled into the receiving opening 28.

The portable power tool 10 additionally has an open-loop and/or closed-loop control unit 32, which is provided to control the drive unit 30 by open-loop and/or closed-loop control in dependence on an angular position of the coupling device 12 relative to the power-tool housing 22 of the portable power tool 10.

In this case, transmission of a driving torque from the drive unit 30 and/or the transmission unit 38 to the cutting strand 16 is interrupted, by means of the open-loop and/or closed-loop control unit 32, as soon as the coupling device 12 is swiveled about the swivel axis 36. The interruption of transmission of a driving torque in this case may be effected mechanically, electrically and/or electronically, the open-loop and/or closed-loop control unit 32 emitting a pulse to effect interruption. When the power-tool parting device 14 has been swiveled into the receiving opening 28, the drive unit 30 is mechanically, electrically and/or electronically disconnected from an energy supply by means of the open-loop and/or closed-loop control unit 32. The open-loop and/or closed-loop control unit 32 is additionally provided to alter a of the drive unit 30 in dependence on an angular position of the coupling device 12, in the angular range of 180°, relative to the power-tool housing 22. The open-loop and/or closed-loop control unit 32 in this case is provided to intervene in a motor control system, for controlling the drive unit 30, in order to alter the drive direction.

For the purpose of driving the cutting strand 16, or for the purpose of transmitting forces and/or torques from the drive unit 30 and/or the transmission unit 38 to the cutting strand 16, the drive unit 30 has an armature shaft (not represented in greater detail here), which is connected in a rotationally fixed manner to a pinion gear 50 (FIG. 4) of the drive unit 30 and/or of the transmission unit 38. When in an operating state, the pinion gear 50 meshes with a toothed wheel 52 of the transmission unit 52. The toothed wheel 52 in this case is realized as a ring gear. It is also conceivable, however, for the toothed wheel 52 to be of another design, considered appropriate by persons skilled in the art. The toothed wheel 52 is connected to an output shaft 54 of the transmission unit 38 in a rotationally fixed manner. On a side that, when in a mounted state, faces toward the cutting strand 16, the output shaft 54 has a toothed end 56, which is provided to be directly and/or indirectly coupled to the cutting strand 16, for the purpose of driving the cutting strand 16. The toothed end 56 is realized as a hexagon.

Figure 5:
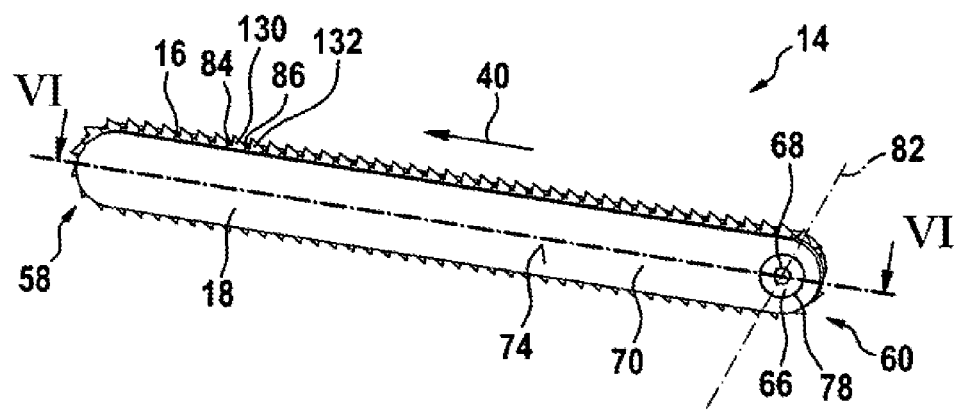
FIG. 5 shows a detail view of the power-tool parting device according to the disclosure, in a schematic representation.
Figure 9:
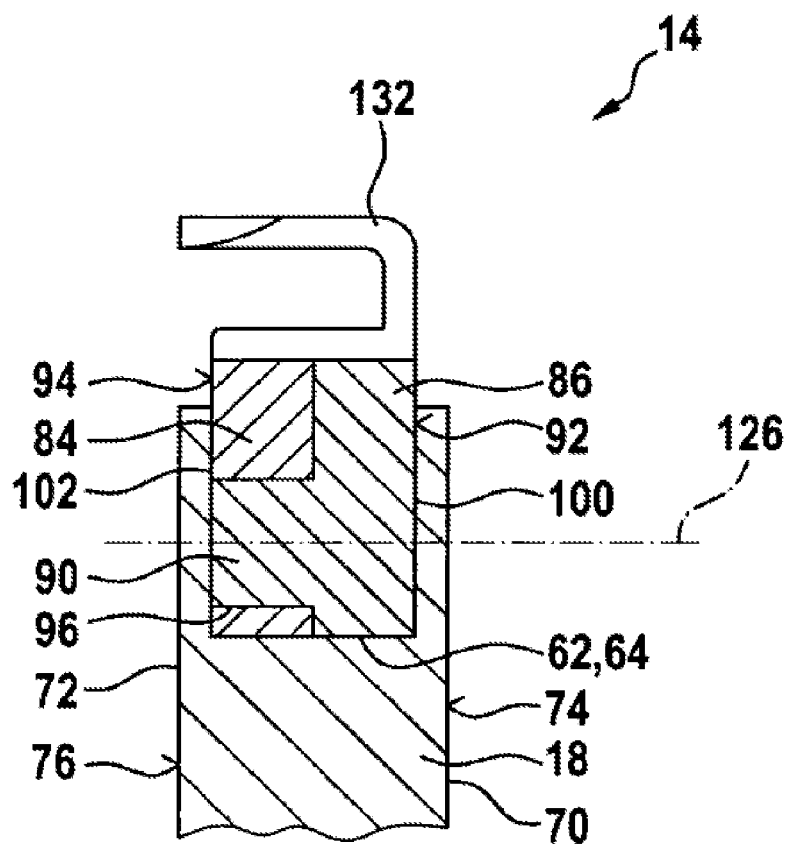
FIG. 9 shows a detail view of a disposition of the cutter carrying elements in a guide unit of the power-tool parting device according to the disclosure, in a schematic representation.

FIG. 5 shows the power-tool parting device 14 when decoupled from the coupling device 12 of the portable power tool 10. The power-tool parting device 14 comprises the cutting strand 16 and the guide unit 18, which together constitute a closed system. The guide unit 18 is realized as a guide bar. The guide unit 18, as viewed in the cutting plane of the cutting strand 16, additionally has two convex ends 58, 60. The convex ends 58, 60 of the guide unit 18 are disposed at sides of the guide unit 18 that face away from each other. The cutting strand 16 is guided by means of the guide unit 18. For this purpose, the guide unit 18 has at least one guide element 62 (FIG. 9), by means of which the cutting strand 16 is guided. The guide element 62 in this case is realized as a guide groove 64, which extends, in the cutting plane of the cutting strand 16, along an entire circumference of the guide unit 18. The cutting strand 16 in this case is guided by means of edge regions of the guide unit 18 that delimit the guide groove 64. It is also conceivable, however, for the guide element 62 to be realized in another manner, considered appropriate by persons skilled in the art, such as, for example, as a rib-type element, formed on to the guide unit 18, that engages in a recess on the cutting strand 16. The cutting strand 16, as viewed in a plane running perpendicularly in relation to the cutting plane, is surrounded on three sides by the edge regions that delimit the guide groove 64 (FIG. 9). During operation, the cutting strand 16 is moved in a revolving manner along the circumference of the guide unit 18, in the guide groove 64, relative to the guide unit 18.

The power-tool parting device 14 additionally has a torque transmission element 66, for driving the cutting strand 16, that is at least partially mounted by means of the guide unit 18. The torque transmission element in this case has a coupling recess 68 that, in a mounted state, is coupled to the toothed end 56 of the output shaft 54 (FIG. 4). It is also conceivable, however, for the torque transmission element 66, when in a coupled state, to be directly coupled to the pinion gear 50 of the drive unit 30 and/or to the toothed wheel 52 of the transmission unit 38, for the purpose of driving the cutting strand 16. The coupling recess 68 is disposed concentrically in the torque transmission element 66. The coupling recess 68 is realized as an internal hexagon. It is also conceivable, however, for the coupling recess 68 to be of another design, considered appropriate by persons skilled in the art.

Figure 6:
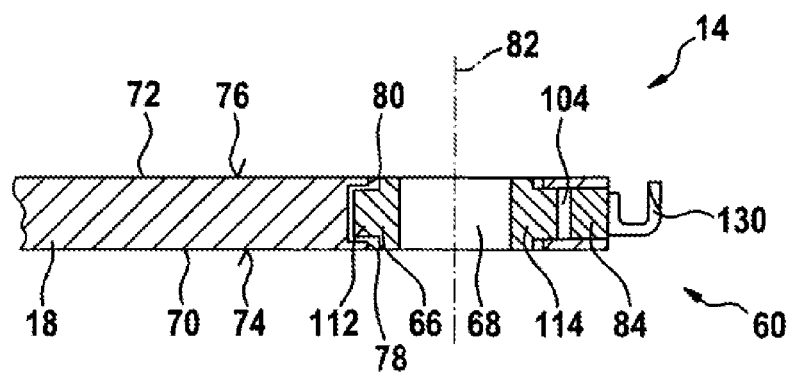
FIG. 6 shows a section view, along the line VI-VI from FIG. 5, of the power-tool parting device according to the disclosure, in a schematic representation.

When the torque transmission element 66 is not coupled to the toothed end 56 of the output shaft 54, the torque transmission element 66 is disposed so as to be movable, transversely in relation to the cutting direction 40 of the cutting strand 16 and/or along the cutting direction 40, in the guide unit 18 (FIG. 6). The torque transmission element 66 in this case is disposed, at least partially, between two outer walls 70, 72 of the guide unit 18. The outer walls 70, 72 run at least substantially parallelwise in relation to the cutting plane of the cutting strand 16. In outer faces 74, 76 of the outer walls 70, 72, the guide unit 18 has a respective recess 78, 80, in which the torque transmission element 66 is disposed, at least partially.

The torque transmission element 66 is disposed with a partial region in the recesses 78, 80 of the outer walls 70, 72. The torque transmission element 66 in this case, at least in the partial region disposed in the recesses 78, 80, has an extent, along a rotation axis 82 of the torque transmission element 66, that closes in a flush manner with one of the outer faces 74, 76 and/or with both outer faces 74, 76 of the guide unit 18. In addition, the partial region of the torque transmission element 66 that is disposed in the recesses 78, 80 of the outer faces 74, 76 of the guide unit 18 has an outer dimension, extending at least substantially perpendicularly in relation to the rotation axis 82 of the torque transmission element 66, that is at least 0.1 mm smaller than an inner dimension of the recesses 78, 80 that extends at least substantially perpendicularly in relation to the rotation axis 82 of the torque transmission element 66. The partial region of the torque transmission element 66 that is disposed in the recesses 78, 80 is disposed, respectively, along a direction running perpendicularly in relation to the rotation axis 82, at a distance from an edge of the outer walls 70, 72 that delimits the respective recess 78, 80. The partial region of the torque transmission element 66 that is disposed in the recesses 78, 80 therefore has a clearance within the recesses 78, 80.

Figure 7:
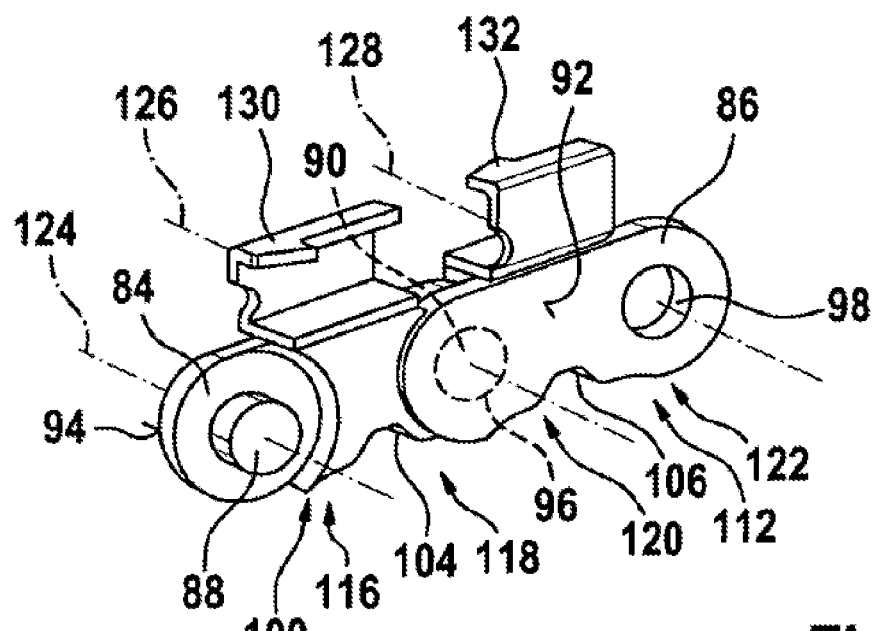
FIG. 7 shows a detail view of cutter carrying elements a cutting strand of the power-tool parting device according to the disclosure, in a schematic representation.

FIG. 7 shows a detail view of cutter carrying elements 84, 86 of the cutting strand 16 of the power-tool parting device 14. The cutting strand 16 comprises a multiplicity of interconnected cutter carrying elements 84, 86, which are in each case connected to each other by means of a connecting element 88, 90 of the cutting strand 16 that closes at least in a substantially flush manner with one of two outer faces 92, 94 of one of the interconnected cutter carrying elements 84, 86 (cf. also FIG. 9). The connecting elements 88, 90 are realized in the form of pins. When the cutting strand 16 is disposed in the guide groove 64, the outer faces 92, 94 run at least substantially parallelwise in relation to the cutting plane of the cutting strand 16. Persons skilled in the art will select an appropriate number of cutter carrying elements 84, 86 for the cutting strand 16 according to the application. The cutter carrying elements 84, 86 are each respectively integral with one of the connecting elements 88, 90. The cutter carrying elements 84, 86 additionally have a respective connecting recess 96, 98, for receiving one of the connecting elements 88, 90 of the interconnected cutter carrying elements 84, 86. The connecting elements 88, 90 are guided by means of the guide unit 18 (FIG. 9). In this case, when the cutting strand 16 is in a mounted state, the connecting elements 88, 90 are disposed in the guide groove 64. The connecting elements 88, 90, as viewed in a plane running perpendicularly in relation to the cutting plane, can be supported on two side walls 100, 102 of the guide groove 64.

The side walls 100, 102 delimit the guide groove 64 along a direction running perpendicularly in relation to the cutting plane. In addition, the side walls 100, 102 of the guide groove 64, as viewed in the cutting plane, starting from the guide unit 18, extend outwardly, perpendicularly in relation to the cutting direction 40 of the cutting strand 16.

Figure 8:
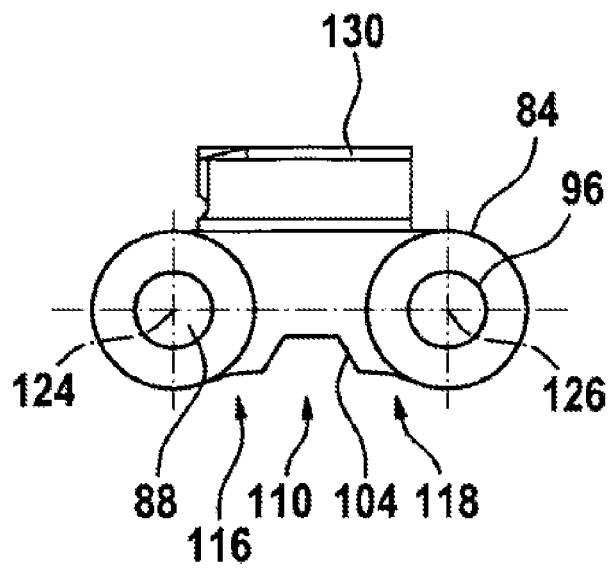
FIG. 8 shows a further detail view of one of the cutter carrying elements of the cutting strand of the power-tool parting device according to the disclosure, in a schematic representation.

The cutter carrying elements 84, 86 of the cutting strand 16 have a respective drive recess 104, 106 that, in a mounted state, is in each case disposed on a side 108, 110 of the respective cutter carrying element 84, 86 that faces toward the torque transmission element 66. The torque transmission element 66, in at least one operating state, engages in the drive recesses 104, 106, for the purpose of driving the cutting strand 16. The torque transmission element 66 in this case is realized as a toothed wheel. The torque transmission element 66 therefore comprises teeth 112, 114, which are provided to engage in the drive recesses 104, 106 of the cutter carrying elements 84, 86, in at least one operating state, for the purpose of driving the cutting strand 16. In addition, the sides 108, 110 of the cutter carrying elements 84, 86 that face toward the torque transmission element 66 are realized in the form of an arc. The sides 108, 110 of the cutter carrying elements 84, 86 that face toward the torque transmission element 66 when in a mounted state are each realized in the form of an arc in partial regions 116, 118, 120, 122, as viewed between a central axis 124 of the respective connecting element 86, 88 and a central axis 126, 128 of the respective connecting recess 96, 98. The arc-shaped partial regions 116, 118, 120, 122 are realized such that in each case they adjoin the drive recesses 104, 106, in which the torque transmission element 66 engages. In this case, the arc-shaped partial regions 116, 118, 120, 122 have a radius corresponding to a radius of a course of the guide groove 64 at the convex ends 58, 60. The partial regions 116, 118, 120, 122 are concave in form (FIG. 8).

The cutting strand 16 additionally has cutting elements 130, 132. The cutting elements 130, 132 are integral, respectively, with one of the cutter carrying elements 84, 86. The number of cutting elements 130, 132 depends on the number of cutter carrying elements 84, 86. Persons skilled in the art will select a suitable number of cutting elements 130, 132 according to the number of cutter carrying elements 84, 86. The cutting elements 130, 132 are provided to effect parting-off and/or removal of material particles of a workpiece that is to be worked (not represented in greater detail here). The cutting elements 130, 132 can be realized, for example, as full cutters, half cutters or as other kinds of cutters, considered appropriate by persons skilled in the art, which are provided to effect parting-off and/or removal of material particles of a workpiece that is to be worked. The cutting strand 16 is continuous. The cutting strand 16 is thus realized as a cutting chain. The cutter carrying elements 84, 86 in this case are realized as chain links, which are connected to each other by means of the pin-type connecting elements 88, 90. It is also conceivable, however, for the cutting strand 16, the cutter carrying elements 84, 86 and/or the connecting elements 88, 90 to be of another design, considered appropriate by persons skilled in the art.

The invention claimed is:

1. A portable power tool comprising:
    a power-tool parting device including at least one cutting strand and at least one guide unit configured to guide the at least one cutting strand;
    at least one drive unit configured to drive the power-tool parting device;
    a power-tool housing configured to enclose the at least one drive unit;
    at least one coupling device configured to couple the at least one drive unit to the at least one cutting strand such that the at least one guide unit is pivotable in a range of approximately 0° to approximately 180° relative to the power-tool housing; and
    at least one stowage device configured to stow the power-tool parting device, at least when the at least one stowage device is coupled to the at least one coupling device.

2. The portable power tool as claimed in claim 1, wherein:
    the power-tool housing has at least one side wall configured to face toward the at least one stowage device, and
    the power-tool housing together with at least one tool covering element of the at least one stowage device, delimits a receiving opening of the at least one stowage device in which the power-tool parting device is configured to be stowed.

3. The portable power tool as claimed in claim 2, wherein the at least one tool covering element is at least partially integral with the power-tool housing.

4. The portable power tool as claimed in claim 1, wherein the at least one coupling device is mounted so as to be movable relative to the power-tool housing, at least when the at least one coupling device is coupled to the power-tool parting device.

5. The portable power tool as claimed in claim 4, wherein the at least one coupling device is mounted such that it can be swiveled, at least relative to the power-tool housing.

6. The portable power tool as claimed in claim 5, further comprising:
    at least one open-loop and/or closed-loop control unit configured to control the at least one drive unit, by open-loop and/or closed-loop control, in dependence on an angular position of the at least one coupling device, relative to the power-tool housing.

7. The portable power tool as claimed in claim 5, further comprising:
    at least one locking unit configured to fix the at least one coupling device, at least when the at least one coupling device is coupled to the power-tool parting device, in an angular position relative to the power-tool housing.

8. A power-tool system comprising:
    at least one power-tool parting device including at least one cutting strand and at least one guide unit configured to guide the at least one cutting strand; and
    at least one portable power tool including (i) at least one drive unit configured to drive the at least one power-tool parting device, (ii) a power-tool housing configured to enclose the at least one drive unit, (iii) at least one coupling device configured to couple the at least one drive unit to the at least one cutting strand such that the at least one guide unit is pivotable in a range of approximately 0° to approximately 180° relative to the power-tool housing, and (iv) at least one stowage device configured to stow the at least one power-tool parting device, at least when the at least one stowage device is coupled to the at least one coupling device,
    wherein the at least one guide unit and the at least one cutting strand constitute a closed system.

9. The power-tool system as claimed in claim 8, wherein the at least one coupling device is configured to enable the at least one power-tool parting device, when the at least one power-tool parting device is coupled to the at least one coupling device, to be swiveled, about a swivel axis running at least substantially perpendicularly in relation to a cutting plane of the at least one cutting strand, into a receiving opening of the at least one stowage device.

* * * * *